Jan. 4, 1944. H. J. B. KERR 2,338,337
POTATO PICKING AND BAGGING MACHINE
Filed Sept. 29, 1942 5 Sheets-Sheet 1
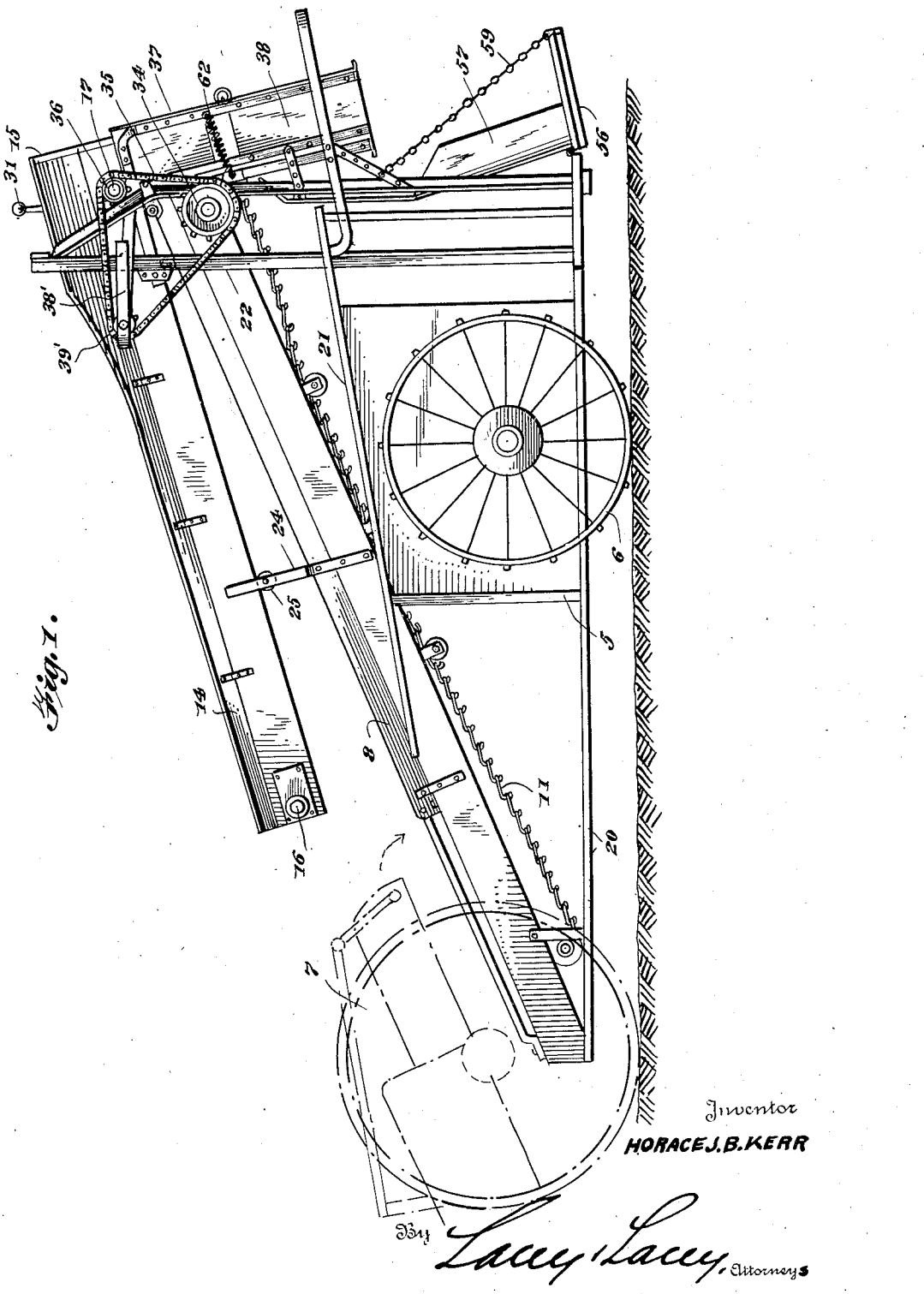
Inventor
HORACE J. B. KERR
By Lacey & Lacey, Attorneys

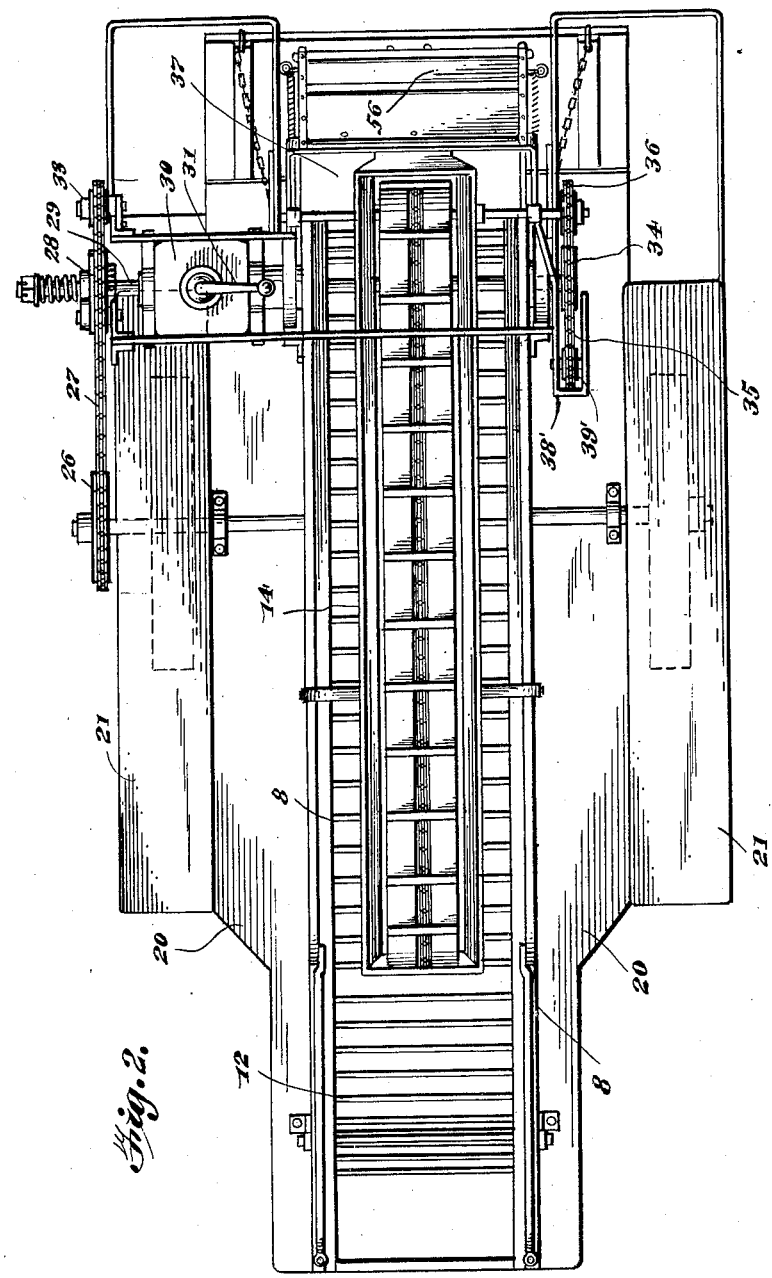

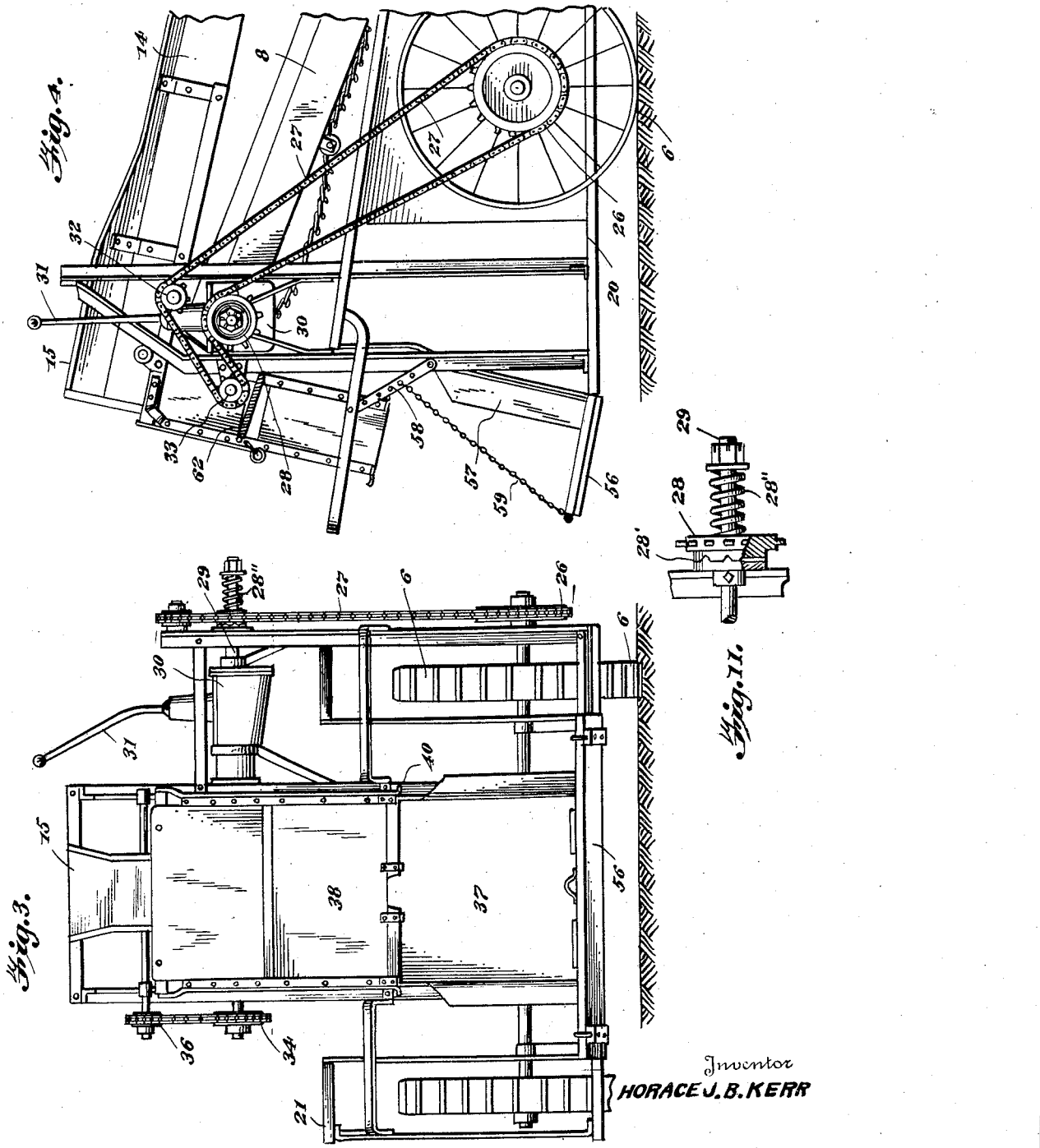

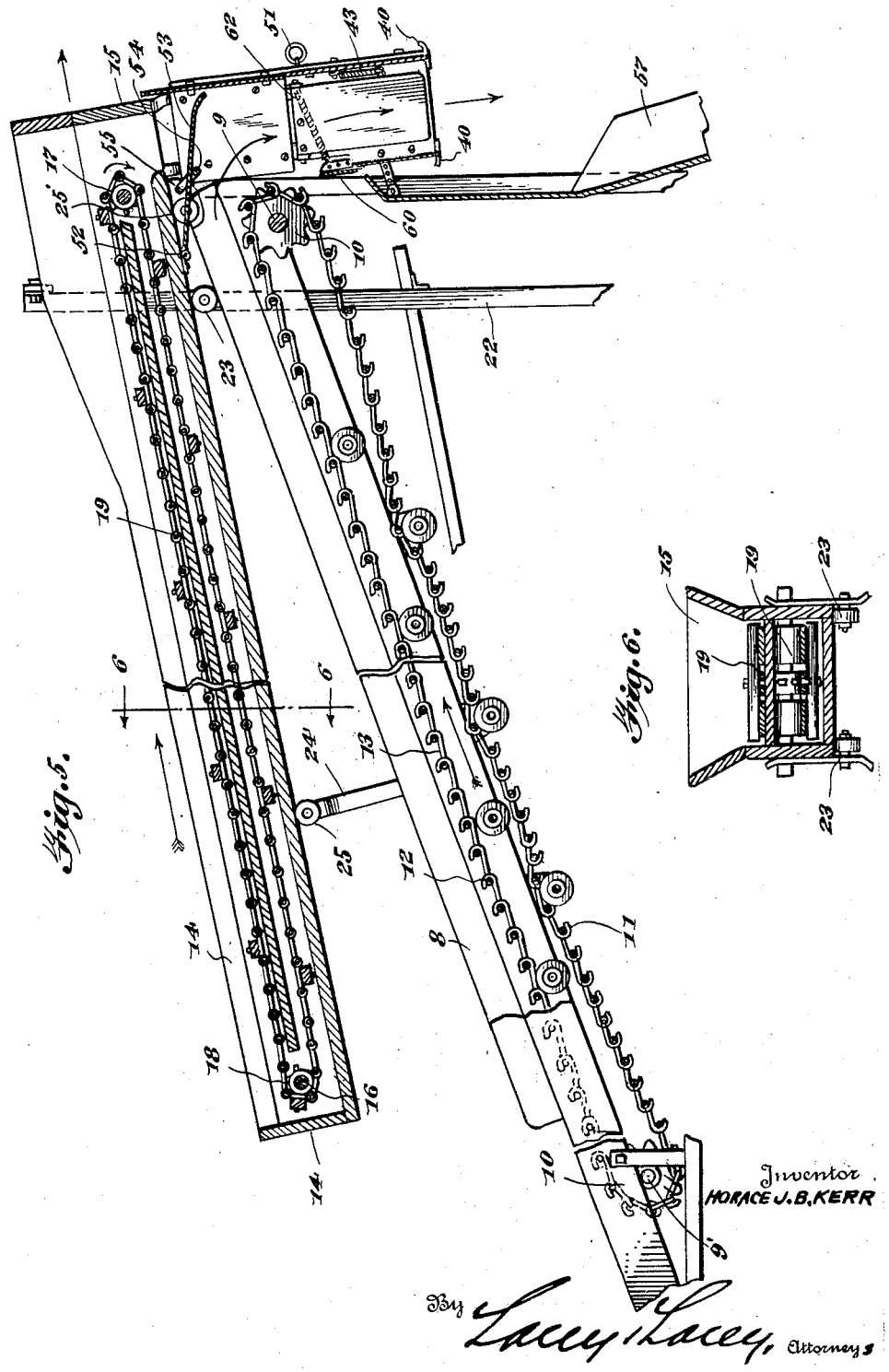

Jan. 4, 1944. H. J. B. KERR 2,338,337
POTATO PICKING AND BAGGING MACHINE
Filed Sept. 29, 1942 5 Sheets-Sheet 5
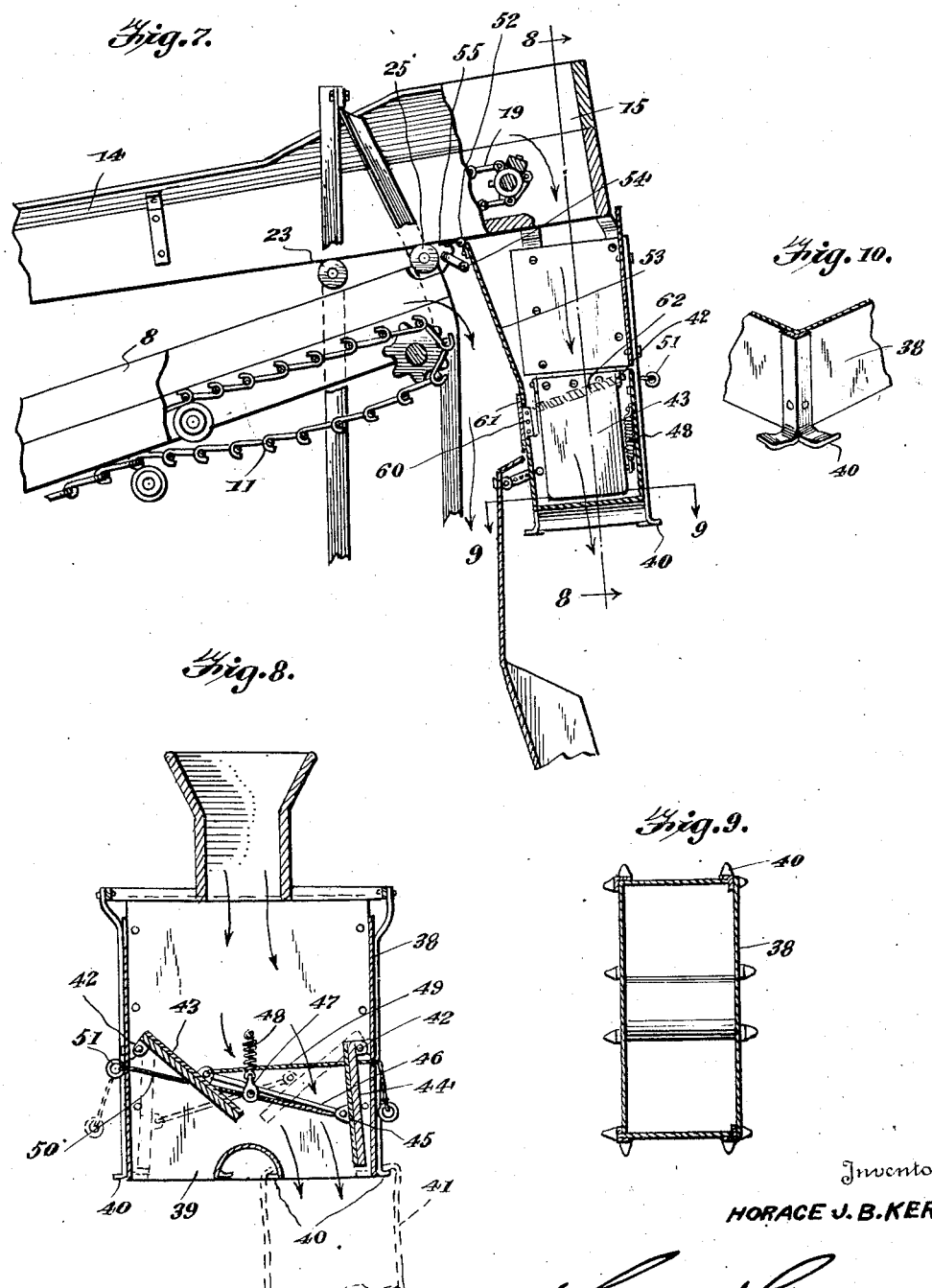
Inventor
HORACE J. B. KERR
Lacey & Lacey, Attorneys Patented Jan. 4, 1944

2,338,337

UNITED STATES PATENT OFFICE 2,338,337

POTATO PICKING AND BAGGING MACHINE

Horace J. B. Kerr, Millersburg, Pa.

Application September 29, 1942, Serial No. 460,163

12 Claims. (Cl. 209—74)

This invention relates to potato pickers and more particularly to a combined potato picking and bagging machine.

The object of the invention is to provide a potato picking and bagging machine of compact and durable construction, especially designed to receive potatoes from a digging machine and which will separate dirt, stones, vines and other foreign material therefrom and deposit the clean potatoes in bags or sacks for transportation or shipment.

A further object of the invention is to provide a potato picker including upper and lower conveyors, one of which is movable longitudinally with respect to the other, means being provided at the end of the machine for receiving potatoes from either conveyor and directing the same into sacks or other containers.

A further object is to provide the machine with a novel bagging attachment including a casing disposed at the discharge end of the conveyors and provided with means for suspending two sacks or bags therefrom, there being deflecting plates pivotally mounted in the casing for directing the potatoes into either bag or sack.

A further object is to provide means connected with the deflecting plates and operative from either side of the casing for simultaneously moving one of said plates to operative position to permit passage of potatoes into one sack and automatically cutting off passage of potatoes to the other sack.

A further object of the invention is to provide a pivoted plate or barrier movable to a position across the top of the bagging attachment when the upper conveyor is moved in a forward direction and to a depending position out of the path of the potatoes when said upper conveyor is moved rearwardly.

In the accompanying drawings:

Figure 1 is a side elevation of a combined potato picker and bagging machine embodying the present invention, a conventional potato digger being indicated in dotted lines in connection therewith.

Figure 2 is a top plan view.

Figure 3 is a rear elevation.

Figure 4 is a side elevation of the rear portion of the machine looking at the opposite side thereof from that shown in Figure 1.

Figure 5 is a longitudinal sectional view showing the upper conveyor shifted in a forward direction to actuate the barrier plate to close the mouth of the bagging attachment when the machine is operating on potatoes having very little foreign matter associated therewith.

Figure 6 is a transverse sectional view, taken on the line 6—6 of Figure 5.

Figure 7 is a side elevation, partly in section, showing the upper conveyor moved rearwardly and the barrier plate swung downwardly to permit the passage of potatoes from said upper conveyor to the bagging attachment.

Figure 8 is a transverse sectional view taken on the line 8—8 of Figure 7, showing the construction and operation of the pivoted deflector plate.

Figure 9 is a transverse sectional view taken on the line 9—9 of Figure 7.

Figure 10 is a detail perspective view showing the construction of the bag suspension hooks.

Fig. 11 is a detail view of the slip clutch.

The combined picking and bagging machine forming the subject matter of the present invention comprises a main supporting frame 5 mounted on traction wheels 6 and adapted to be connected with a potato digger of any suitable construction, indicated in dotted lines at 7. Secured to the main supporting frame 5 is a stationary downwardly inclined conveyor frame 8 provided with oppositely disposed transverse shafts 9 and 9' and carrying sprocket wheels 10 and around which sprocket wheels is trained an endless conveyor 11 preferably formed of transverse rods 12 spaced apart by connecting links 13. Arranged above the stationary conveyor frame 8 is a longitudinally movable conveyor frame 14, the upper portion of which is open and the rear end thereof provided with an inclined hopper 15. Journaled in the movable conveyor frame 14, at the opposite ends thereof, are transverse shafts 16 and 17 carrying sprocket wheels 18 for engagement with a conveyor 19 for feeding potatoes to the hopper 15.

Disposed on opposite sides of the machine and secured to the base of the main supporting frame 5 in any suitable manner, are longitudinal strips 20 constituting a platform, and arranged above said platform and extending over the traction wheels 6, are bench members or seats 21 on which the operator may sit when picking potatoes from the conveyor 11 and depositing said potatoes on the conveyor 19 for delivery to the bagging mechanism hereinafter referred to. Secured to the rear end of the supporting frame is an upright 22 on which is journaled a roller 23, there being a short upright 24 secured to the stationary conveyor frame and in which is mounted for rotation a similar roller 25, the purpose of these rollers being to permit easy longitudinal adjustment of the movable conveyor frame when desired. A third guide roller 25' is preferably disposed near the rear end of the stationary conveyor frame, as shown. One of the traction wheels 6 is provided with a sprocket wheel 26 around which is trained a sprocket chain 27 leading to a sprocket wheel 28 mounted on the shaft 29 of a conventional selective speed or gear transmission device, indicated at 30. The sprocket wheel 28 is normally and yieldably held in engagement with a slip clutch 28' by means of a coil spring 28" on the end of the shaft 29 so that in case a stone or other foreign object tends to interfere with the proper functioning of the machine, the sprocket 28 will slip out of engagement with the clutch and thus prevent damage to said machine. The inner end of the shaft 29 is connected with the shaft 9 of the lower conveyor 11 and operatively connected with said selective speed device 30 is a hand lever 31 by operating which the speed of the conveyors can be controlled at will. Journaled on the main supporting frame adjacent the sprocket wheel 28 are small idle sprocket wheels 32 and 33 over which the sprocket chain 27 travels and which idle sprocket wheels serve to keep the sprocket chain under proper tension. That portion of the shaft 9 on the opposite side of the machine from the selective speed device is extended longitudinally beyond the adjacent portion of the supporting frame and is provided with a terminal sprocket wheel 34 around which extends a sprocket chain 35 passing over a relatively small sprocket wheel 36 secured to the shaft 17 of the upper conveyor and by means of which motion is imparted from the lower conveyor to the upper conveyor.

The bagging mechanism, indicated in general by the numeral 37, is secured to the upper conveyor frame 14 immediately below the hopper 15 thereof and mounted on the supporting frame of the bagging mechanism is a bracket 38' having a sprocket 39' mounted for rotation thereon and over which travels the sprocket chain 35, the parts being so constructed as to permit longitudinal movement of the upper conveyor frame 14 without exerting undue tension on the sprocket chain or affecting the driving function of said sprocket chain.

As previously stated, the bagging mechanism is located at the rear of the machine and comprises a supporting frame in which is mounted a substantially rectangular casing 38 having its upper end communicating with the hopper 15 and its lower end open, as indicated at 39, and provided with a plurality of pairs of laterally extending hooks 40 for supporting bags or sacks, indicated in dotted lines at 41. Disposed within the casing 38 and pivotally mounted at 42, are oppositely disposed deflector plates 43 and 44, the purpose of which is to alternately cut off the passage of potatoes through the casing to one of the bags or sacks 41 while the other is being filled with potatoes. The deflector plates 43 and 44 are provided with inwardly extending ears 45 and pivotally mounted in said ears in a connecting rod 46, the intermediate portion of which extends over a roller in a vertical hanger 47 yieldably suspended from the casing 38 by means of a coil spring 48. As a means for operating the deflector plates, there are provided suitable cords or chains 49 and 50 having their inner ends connected to the ears 45 and their outer ends passing through suitable openings in the casing 38 and provided with terminal finger pieces preferably in the form of rings 51. The rear portion of the casing 38 immediately below the hopper 15 is normally open so as to permit communication between the lower conveyor 11 and said casing, when desired. Pivotally mounted at 52 on the bottom of the movable conveyor frame 14 is a cutoff or barrier plate 53 which extends in the path of the potatoes from the upper conveyor when said upper conveyor is moved forwardly on the rollers 23, 25 and 25', and which plate closes the opening in the rear portion of the casing 38 when the upper conveyor 14 is moved rearwardly. This movement of the barrier plate 53 is effected by a crank shaft 54 mounted in a bracket 55 on the stationary conveyor frame 8, the parts being so constructed that when the upper conveyor frame 14 is moved rearwardly to the position shown in Figure 7 of the drawings, the barrier plate 53 will drop by gravity to lowered position at the rear of the casing and when the upper conveyor frame 14 is moved in a forward direction, the crank shaft 54 will press against the barrier plate 53 and move same to the elevated position shown in Figure 5 of the drawings, and in which position said plate will prevent the passage of potatoes from the upper conveyor into the casing of the bagging mechanism.

Arranged below the bagging mechanism is a platform 56 adapted to receive the bags or sacks to be filled with potatoes, said platform being provided with a vertically disposed concavo-convex back plate 57 connected to the lower portion of the casing 38 by means of links 58 and provided with suspension chains 59 extending from said links to the forward end of the platform. Pivotally mounted on the rear portion of the casing 38 is a bracket 60 provided with an upstanding lip or keeper 61 against which the lower end of the barrier plate 53 is adapted to rest when said plate is in lowered position. As a means for preventing stones and other foreign particles which may lodge between the rods of the lower conveyor from jamming the machine, there is provided a spring 62, one end of which is secured to the casing while the other end thereof is connected with the pivoted bracket.

In operation, the upper conveyor 14 is slid rearwardly by hand on the rollers 23 and 25 to the position shown in Figure 7 of the drawings and in which position it is held by a suitable catch or hook (not shown) on the conveyor frame which engages the adjacent upright 22. The machine is then connected with a suitable potato digger and drawn over a field by a tractor or any other source of power. As the potatoes are removed from the rows by the digger, the operator on the seat 21 will pick the potatoes from the lower conveyor and deposit said potatoes onto the upper conveyor, where they will pass downwardly through the hopper 15 and into the casing of the bagging mechanism. Before starting the machine, the bags or sacks 41 are suspended from the hooks 40 with the lower ends of the bags resting on the platform 56. The deflector plates 43 and 44 are then adjusted by means of the operating cords 50, so that one of the deflectors will cut off passage of potatoes to one of the bags and direct said potatoes into the other bag. After one of the bags has been filled, the cords 50 are actuated to reverse the position of the deflector plates and direct the potatoes into the remaining bag, and this operation is repeated during the operation of the machine so that the bags are alternately filled with potatoes and thence removed for storage or shipment.

During the operation of the machine, stones, twigs, vines, and other foreign matter taken up and deposited with the potatoes on the lower conveyor 11 will be carried rearwardly between the end of said lower conveyor and the bagging mechanism and discharged onto the ground or any other place desired. Where it is not desired to employ a workman to manually pick the potatoes from the lower conveyor and deposit said potatoes on the upper conveyor for delivery to the bagging mechanism, or where the nature of the soil is such as not to require selective picking of the potatoes from the lower conveyor for transfer to the upper conveyor, the upper conveyor frame 14 is moved forwardly to the position shown in Figure 5 of the drawings and in which position it will be held by the bagging mechanism bearing against the frame of the lower conveyor. During the forward movement of the conveyor frame 14, the crank shaft 54 will engage and elevate the barrier plate 53 so as to cut off communication between the hopper 15 and the bagging mechanism. The potatoes delivered by the picker onto the lower conveyor 11 will then travel upwardly and rearwardly through the opening in the rear wall of the casing formed by the elevation of the barrier plate 53 and thence onto the deflector plates 43 and 44 for delivery to the bags or sacks in the manner previously set forth.

From the foregoing description it is thought that the construction and operation of the device will be readily understood by those skilled in the art and further description thereof is deemed unnecessary.

Having thus described the invention, what is claimed is:

1. In a potato picker, the combination with a supporting frame, a stationary conveyor frame mounted thereon, a movable conveyor frame disposed above the stationary frame and movable longitudinally with respect thereto, conveyors operating in said frames, bagging mechanism communicating with the conveyors, a barrier mounted on the movable conveyor frame, and means operable by the movable conveyor frame when moved in one direction for actuating the barrier to cut off communication between the conveyor of the movable frame and the bagging mechanism and to establish communication with said bagging mechanism when said conveyor frame is moved in another direction.

2. In a potato picker, the combination with a supporting frame, a stationary conveyor frame mounted thereon, a movable conveyor frame disposed above the stationary frame and movable longitudinally with respect thereto, conveyors operating in said frames, bagging mechanism communicating with the conveyors, a cut-off barrier plate pivotally mounted on the movable frame, and means carried by the stationary frame and operable by the movable conveyor frame when moved in one direction for actuating said barrier plate to cut off communication between the conveyor of said movable frame and the bagging mechanism and when moved in another direction to release the barrier plate and establish communication with said bagging mechanism.

3. In a potato picker, the combination with a supporting frame, a stationary conveyor frame mounted thereon, a movable conveyor frame disposed above the stationary frame and movable longitudinally with respect thereto, conveyors operating in said frames, bagging mechanism communicating with the conveyors, a cut-off barrier plate pivotally mounted on the movable conveyor frame, and a crank shaft carried by the stationary frame and adapted to engage the barrier plate and cut off communication between the conveyor of the movable frame and said bagging mechanism when the movable frame is moved in one direction and to release said barrier plate to establish communication with said bagging mechanism when the movable conveyor frame is moved in another direction.

4. In a potato picker, the combination with a supporting frame, superposed upwardly inclined movable and stationary conveyor frames mounted thereon, the movable conveyor frame being provided with a terminal hopper, conveyors operating in said conveyor frames, bagging mechanism communicating with the conveyors and including a casing having its lower end open, bag suspending means on the open end of the casing, deflector plates pivotally mounted within the casing for directing potatoes to a selected bag, and means for moving the movable frame in one direction to cut off communication between the conveyor of said movable frame and the bagging mechanism and in another direction to establish communication with said bagging mechanism.

5. In a potato picker, the combination with a supporting frame, a stationary conveyor frame mounted thereon, a movable conveyor frame disposed above the stationary frame and movable longitudinally with respect thereto, conveyors operating in said frames, bagging mechanism communicating with the conveyors and including a casing secured to the movable conveyor frame and having an open end, means for supporting bags on the open end of the casing, deflector plates pivotally mounted within the casing, and means operatively connected with the deflector plates and operable independently of the movable conveyor frame for actuating said plates for alternately directing the potatoes into one bag and cutting off passage of potatoes into an adjacent bag.

6. In a potato picker, the combination with a supporting frame, superposed upper and lower conveyor frames mounted thereon, one of which is movable longitudinally with respect to the other, conveyors operating in said frames, bagging mechanism communicating with the conveyors and including a casing secured to and movable with the movable conveyor frame and having an open end, deflector plates pivotally mounted for tilting movement within the casing, a rod forming a pivotal connection between said deflector plates, means for suspending bags at the open end of the casing, and operating cords connected with the deflector plates and extending through the adjacent walls of the casing, said cords being operable independently of the movable conveyor frame for alternately moving said deflector plates to permit the passage of potatoes into one of the bags and to cut off passage of potatoes to another bag.

7. In a potato picker, the combination with a supporting frame, superposed conveyor frames mounted thereon, one of which is movable longitudinally with respect to the other, conveyors operating in said frames, bagging mechanism communicating with the conveyors and including a casing secured to and depending from the movable conveyor frame and having its lower end open and provided with means for suspending bags therefrom, deflector plates pivotally mounted within the casing, a rod forming a pivotal connection between said plates, a guide receiving the rod, a spring forming a connection between the guide and casing, and flexible elements connected with the deflector plates and operable from the outside of the casing for actuating said plates to direct potatoes into one of the bags and to cut off passage of potatoes into an adjacent bag.

8. In a potato picker, the combination with a supporting frame, superposed stationary and movable conveyor frames mounted thereon, conveyors operating in said frames, bagging mechanism communicating with the conveyors and including a casing having an opening in its rear wall and its lower end open, means carried by the casing for supporting a plurality of sacks, means disposed within the casing for directing potatoes into a selected sack, a cut-off barrier plate pivotally mounted on the movable conveyor frame, and means mounted on the stationary conveyor frame and adapted to engage and move the barrier plate to a position across the interior of the casing when the movable conveyor frame is moved in one direction and to permit said barrier plate to drop by gravity and close the opening in the rear of the casing when the movable frame is moved in another direction.

9. In a potato picker, the combination with a supporting frame, superposed conveyor frames mounted thereon, one of which is movable longitudinally with respect to the other, conveyors operating in said frame, a platform disposed at the rear of the supporting frame and adapted to receive and support bags, bagging mechanism disposed above the platform and communicating with the conveyors, said bagging mechanism including a casing secured to the movable conveyor frame and having its lower end open, hooks carried by the lower end of the casing for engagement with the bags on the platform, deflector plates pivotallly mounted within the casing, and means operatively connected with the deflector plates and operable independently of the movement of said movable conveyor frame for directing potatoes into a selected bag and cutting off the passage of potatoes to another bag.

10. In a potato picker, the combination with a supporting frame, superposed stationary and movable conveyor frames mounted thereon, conveyors operating in said frames, bagging mechanism communicating with the conveyors and including a casing, a barrier plate pivotally mounted on the movable conveyor frame, a crank shaft mounted on the stationary conveyor frame and adapted to actuate the barrier plate to cut off communication between the movable conveyor frame and the interior of the casing when the movable conveyor frame is moving in one direction and to permit said barrier plate to swing downwardly to the rear of the casing when the movable conveyor frame is moved in another direction, the lower end of the casing being open and provided with means for supporting a plurality of bags, a bracket pivotally mounted on the casing at the rear thereof, a spring forming a connection between the free end of the bracket and said casing, said free end of the bracket forming a stop for the barrier plate when in lowered position, and means for directing potatoes into a selected bag.

11. In a potato picker, the combination with a wheeled supporting frame for attachment to a potato digger, superposed stationary and movable conveyor frames mounted on the supporting frame, rollers mounted on the supporting frame and engaging the movable conveyor frame, conveyors operating in said frames, the movable conveyor frame being provided with a hopper, bagging mechanism including a casing communicating with the hopper and having an opening in its rear wall arranged opposite the stationary conveyor, the lower end of said casing being open, a cut-off barrier pivotally mounted on the movable frame and movable from a position transversely of the casing to a position closing the opening in the rear wall of said casing, a platform mounted on the rear end of the wheeled frame and adapted to receive bags, said movable frame being movable in one direction to actuate the barrier to cut off communication between the conveyor of said movable frame and casing and establish communication between the conveyor of the stationary frame and the interior of the casing and in another direction to establish communication between the conveyor of the movable frame and said casing and cut off the conveyor of the stationary frame.

12. In a potato picker, the combination with a wheeled supporting frame, superposed stationary and movable conveyor frames mounted on the supporting frame, conveyors operating in said frames, bagging mechanism including a casing communicating with the conveyor of the movable frame and provided with an opening opposite the conveyor of the stationary frame, a cut-off barrier plate pivotally mounted on the movable frame, and an actuating member mounted on the stationary frame and adapted to move the barrier plate to a position transversely of the casing when the movable conveyor frame is moved in one direction and to permit said barrier plate to swing downwardly and close the opening in the casing when the movable conveyor frame is moved in another direction.

HORACE J. B. KERR.